US008826038B1

(12) United States Patent
Langhammer et al.

(10) Patent No.: US 8,826,038 B1
(45) Date of Patent: *Sep. 2, 2014

(54) FPGA CONFIGURATION BITSTREAM PROTECTION USING MULTIPLE KEYS

(75) Inventors: Martin Langhammer, Salisbury (GB); Juju Joyce, Sunnyvale, CA (US); Keone Streicher, San Ramon, CA (US); David Jefferson, Morgan Hill, CA (US); Srinivas Reddy, Fremont, CA (US); Nitin Prasad, Bethesda, MD (US)

(73) Assignee: Altera Corporation, San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/474,745

(22) Filed: May 18, 2012

Related U.S. Application Data

(62) Division of application No. 12/785,400, filed on May 21, 2010, now Pat. No. 8,209,545, which is a division of application No. 11/042,477, filed on Jan. 25, 2005, now Pat. No. 7,725,738.

(51) Int. Cl.
*G06F 21/00* (2013.01)

(52) U.S. Cl.
USPC ........................................................ 713/191

(58) Field of Classification Search
USPC .............. 713/189, 191, 193, 194; 726/26, 27; 380/44, 45, 47, 281, 84
See application file for complete search history.

(56) References Cited

U.S. PATENT DOCUMENTS

| 4,598,170 | A | 7/1986 | Piosenka et al. |
| 4,812,675 | A | 3/1989 | Goetting |
| 6,212,639 | B1 | 4/2001 | Erickson et al. |
| 6,608,792 | B2 | 8/2003 | Pitts |
| 6,996,713 | B1 | 2/2006 | Trimberger |
| 7,028,191 | B2 | 4/2006 | Michener et al. |
| 7,197,647 | B1 * | 3/2007 | Van Essen et al. ............. 713/189 |
| 7,206,943 | B2 | 4/2007 | Kobayashi et al. |
| 7,225,340 | B2 | 5/2007 | Asahi et al. |
| 7,299,203 | B1 | 11/2007 | Nelson |
| 7,325,141 | B2 | 1/2008 | Chow et al. |
| 7,631,186 | B2 | 12/2009 | Okabe |
| 7,725,738 | B1 * | 5/2010 | Langhammer et al. ....... 713/191 |
| 2002/0114455 | A1 | 8/2002 | Asahi et al. |
| 2002/0145931 | A1 | 10/2002 | Pitts |
| 2002/0199110 | A1 | 12/2002 | Kean |

(Continued)

OTHER PUBLICATIONS

Office Action from U.S. Appl. No. 11/042,019 dated Oct. 21, 2008.
Office Action from U.S. Appl. No. 11/042,032 dated Feb. 2, 2009.

(Continued)

*Primary Examiner* — Edward Zee (57) ABSTRACT

Circuits, methods, and apparatus that prevent detection and erasure of encoding or encryption keys. These encoding keys may be used to encode a configuration bitstream or other data for an FPGA or other device. An exemplary embodiment of the present invention masks a first key to form an encoding key in order to prevent detection of the first key. In a specific embodiment, the first key is encoded using a second key. The encoded key is used to encode a configuration bitstream or other data. The encoded key is stored on an FPGA or other device. When the device is to be configured, the encoded key is retrieved and used to decode the bitstream or other data. A further embodiment stores an encryption key in a one-time programmable memory (OTP) array to prevent its erasure or modification. The encoding key may be further obfuscated before storage.

18 Claims, 10 Drawing Sheets

(56) References Cited

U.S. PATENT DOCUMENTS

| | | | |
|---|---|---|---|
| 2003/0021421 A1* | 1/2003 | Yokota et al. | 380/277 |
| 2004/0186991 A1 | 9/2004 | Kobayashi et al. | |
| 2005/0113070 A1 | 5/2005 | Okabe | |
| 2005/0289355 A1 | 12/2005 | Kitariev et al. | |

OTHER PUBLICATIONS

Office Action from U.S. Appl. No. 11/042,032 dated Jul. 2, 2008.
Office Action from U.S. Appl. No. 11/042,937 dated Nov. 28, 2008.
Office Action from U.S. Appl. No. 11/435,416 dated Sep. 19, 2007.
Office Action from U.S. Appl. No. 11/435,416 dated Mar. 26, 2008.

* cited by examiner

FPGA CONFIGURATION BITSTREAM PROTECTION USING MULTIPLE KEYS

CROSS-REFERENCE TO RELATED APPLICATIONS

This application is a division of, and claims the benefit of and priority to, U.S. patent application Ser. No. 12/785,400, filed May 21, 2010, which is a division of, and claims the benefit of and priority to, U.S. patent application Ser. No. 11/042,477, filed Jan. 25, 2005, each of which is incorporated herein by reference in its respective entirety.

BACKGROUND

The present invention relates to configuring field programmable gate arrays generally, and more particularly to protecting configuration bitstreams from detection or alteration.

Field programmable gate array devices are logic or mixed signal devices that may be configured to provide a user-defined function. FPGAs are typically configured using data received from a configuration device. This data may be referred to as a configuration bitstream or program object file (POF). This bitstream opens and closes switches formed on an FPGA such that desired electrical connections are made.

Modern FPGAs contain hundreds of thousands of logic gates, as well as processors, memories, dedicated analog function blocks, and other circuits. This extensive circuitry requires a correspondingly long configuration bitstream to configure it. For example, 55 Megabits of configuration data are now needed by some FPGAs.

This configuration data represents an FPGA user design that is the outcome of a huge investment in manpower and research and development costs, often in the million dollar range. To protect this investment, configuration bitstreams are often encrypted. The encrypted bitstream is decrypted using a key stored on the FPGA, and the FPGA is then configured. When the FPGA is configured by a configuration device, the bitstream that is susceptible to detection is encrypted and thus protected.

Unfortunately, problems remain even with encryption. For example, if the encryption key can be determined, for example by examining an FPGA, the encrypted bitstream can be copied and the protected device can be cloned. Alternately, if the key is determined, the device can be reconfigured to provide a different function. This can be particularly problematic if the device is performing an important function, such as network security. Similar problems exist if other types of encoding are used.

Thus, what is needed are circuits, methods, and apparatus that provide encoding keys that cannot readily be determined.

SUMMARY

Accordingly, embodiments of the present invention provide circuits, methods, and apparatus that prevent detection of an encryption or encoding key. This key may be used to encode and decode a configuration bitstream for an FPGA or other programmable or configurable device, or it may be used on any device to prevent detection of bitstreams or other types of information, for example, device serial numbers or other identifying or security information.

One embodiment of the present invention alters or masks a first key. The result of this alteration is then used encode a configuration bitstream either directly or after further processing or alteration, and it is stored on an FPGA or other device instead of the first key. The first key can be altered or masked by encryption, scrambling, exclusive-ORing with a second key or other pattern to generate a result. Alternately, other functions, which may be presently known or later developed, can be used to alter or mask the first key, the result of which can then be stored on the FPGA or other device. This masked key is retrieved and used to decode the encoded configuration bitstream either directly or again, after further alteration.

An exemplary embodiment of the present invention uses two keys to form a single encoding key. The encoding key is used to encode a configuration bitstream or other data needing protection, and the encoding key is stored on an FPGA or other device. When the device is to be configured, the key is retrieved and the encoded bitstream is received on the FPGA. The retrieved key is then used to decode the bitstream, which then configures the FPGA.

Another exemplary embodiment of the present invention uses two keys. The first key is used to encode a second key. The result is used to encode the second key again, and both products are stored. When the device is to be configured, both products are retrieved and one is used to decode the other. The result is used to decode the result of the two encoded keys. A key that may then be used to decode an encoded bitstream is decoded using these two keys.

A further embodiment of the present invention stores one or more keys in a one-time programmable memory (OTP) array to prevent their erasure or modification. The encoding key may be further obfuscated by one or more of a number of different methods. For example, the key may be obfuscated before storage. This may be done by encryption, permutation, inversion, compression, or a combination of these or other functions. After retrieval from storage, the reverse is performed to recover the key. Optionally, the key may be further encoded with itself and then used to encode the configuration bitstream. If this optional encoding step is done, the retrieved key is encoded again with itself, and the result is used to decode the bitstream. These and other methods may be used separately or in combination to further obfuscate the key. Various embodiments of the present invention may incorporate one or more of these and the other features described herein.

A better understanding of the nature and advantages of the present invention may be gained with reference, to the following detailed description and the accompanying drawings.

DESCRIPTION OF EXEMPLARY EMBODIMENTS

Figure 1:
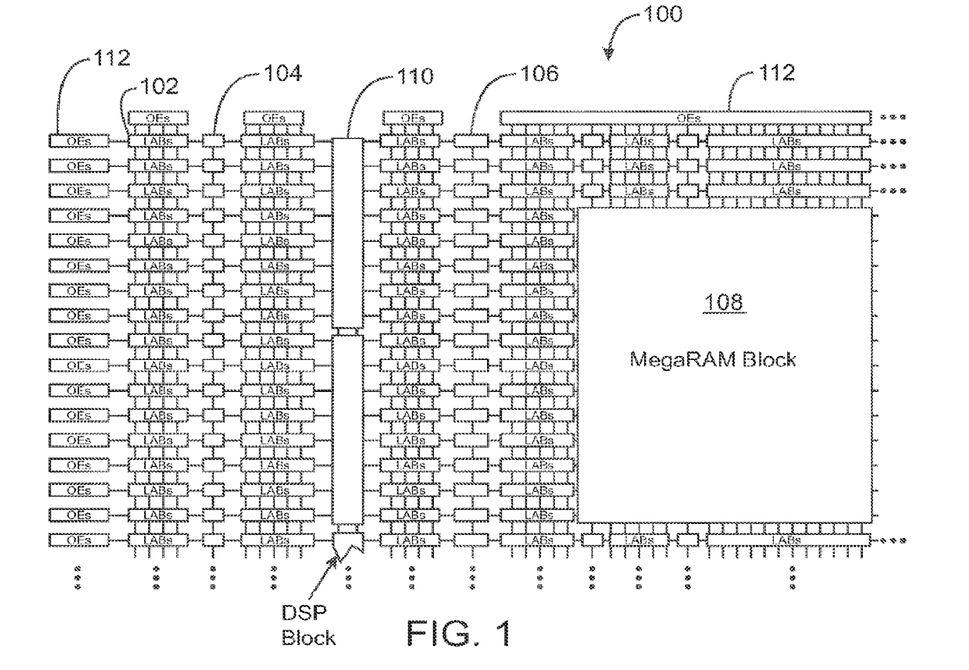
FIG. 1 is a simplified block diagram of a programmable logic device that benefits by the incorporation of embodiments of the present invention.

FIG. 1 is a simplified partial block diagram of an exemplary high-density programmable logic device 100 wherein techniques according to the present invention can be utilized. PLD 100 includes a two-dimensional array of programmable logic array blocks (or LABs) 102 that are interconnected by a network of column and row interconnections of varying length and speed. LABs 102 include multiple (e.g., 10) logic elements (or LEs), an LE being a small unit of logic that provides for efficient implementation of user defined logic functions.

PLD 100 also includes a distributed memory structure including RAM blocks of varying sizes provided throughout the array. The RAM blocks include, for example, 512 bit blocks 104, 4K blocks 106 and an M-Block 108 providing 512K bits of RAM. These memory blocks may also include shift registers and FIFO buffers. PLD 100 further includes digital signal processing (DSP) blocks 110 that can implement, for example, multipliers with add or subtract features.

It is to be understood that PLD 100 is described herein for illustrative purposes only and that the present invention can be implemented in many different types of PLDs, FPGAs, and the other types of digital integrated circuits.

Figure 2:
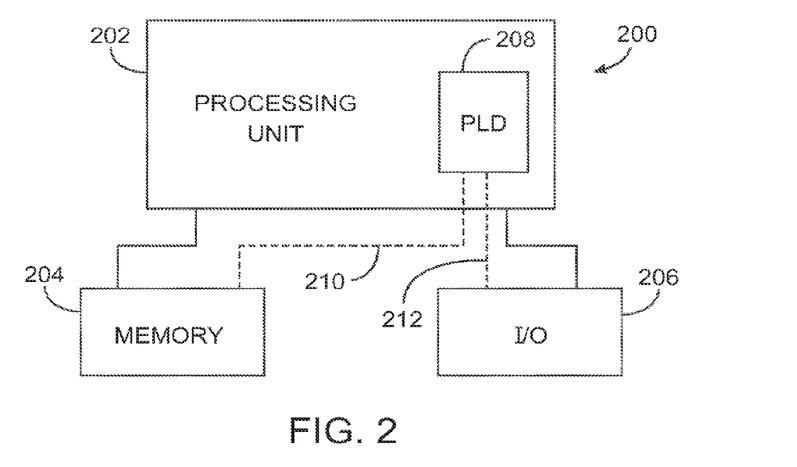
FIG. 2 is a block diagram of an electronic system that benefits by the incorporation of embodiments of the present invention.

While PLDs of the type shown in FIG. 1 provide many of the resources required to implement system level solutions, the present invention can also benefit systems wherein a PLD is one of several components. FIG. 2 shows a block diagram of an exemplary digital system 200, within which the present invention may be embodied. System 200 can be a programmed digital computer system, digital signal processing system, specialized digital switching network, or other processing system. Moreover, such systems may be designed for a wide variety of applications such as telecommunications systems, automotive systems, control systems, consumer electronics, personal computers, Internet communications and networking, and others. Further, system 200 may be provided on a single board, on multiple boards, or within multiple enclosures.

System 200 includes a processing unit 202, a memory unit 204 and an I/O unit 206 interconnected together by one or more buses. According to this exemplary embodiment, a programmable logic device (PLD) 208 is embedded in processing unit 202. PLD 208 may serve many different purposes within the system in FIG. 2. PLD 208 can, for example, be a logical building block of processing unit 202, supporting its internal and external operations. PLD 208 is programmed to implement the logical functions necessary to carry on its particular role in system operation. PLD 208 may be specially coupled to memory 204 through connection 210 and to I/O unit 206 through connection 212.

Processing unit 202 may direct data to an appropriate system component for processing or storage, execute a program stored in memory 204 or receive and transmit data via I/O unit 206, or other similar function. Processing unit 202 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 208 can control the logical operations of the system. In an embodiment, PLD 208 acts as a reconfigurable processor, which can be reprogrammed as needed to handle a particular computing task. Alternately, programmable logic device 208 may itself include an embedded microprocessor. Memory unit 204 may be a random access memory (RAM), read only memory (ROM), fixed or flexible disk media, PC Card flash disk memory, tape, or any other storage means, or any combination of these storage means.

Figure 3A:
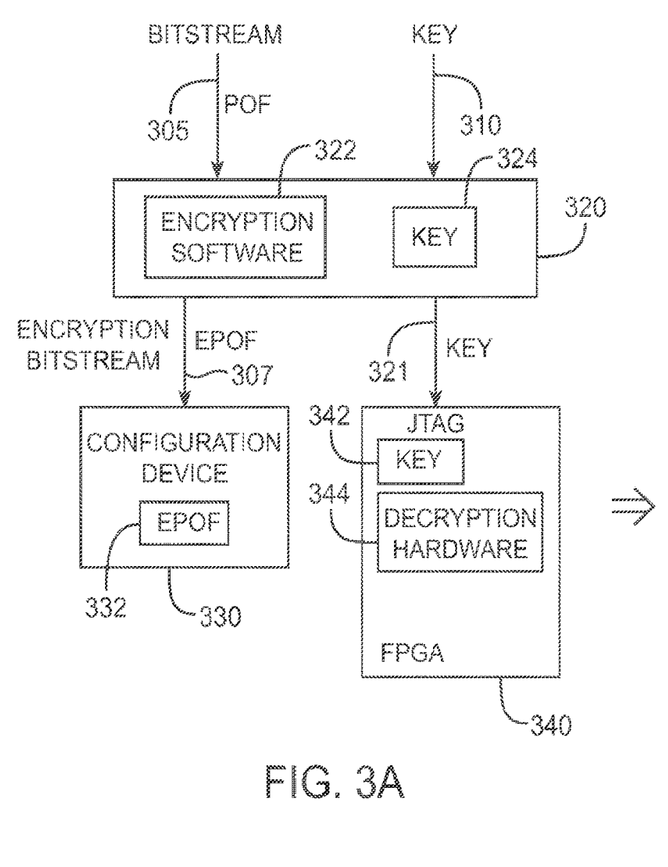
FIGS. 3A and 3B illustrate circuits and software that benefit by incorporating embodiments of the present invention.
Figure 3B:
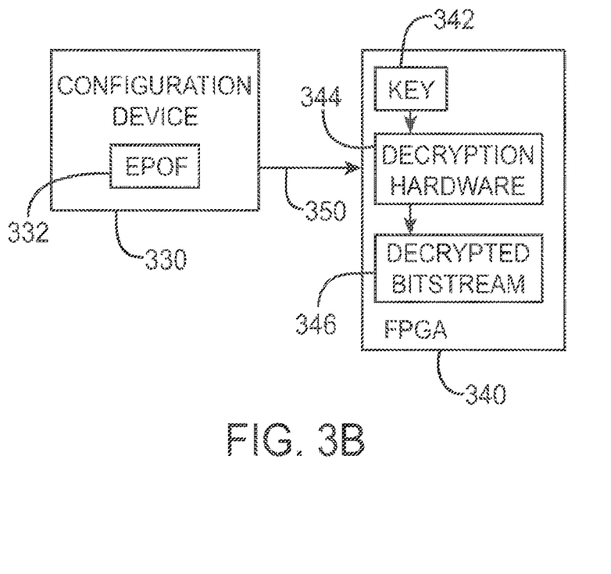

FIGS. 3A and 3B illustrate circuits and software that may be improved by incorporating embodiments of the present invention. These circuits and software may be used to provide encrypted configuration information to field programmable gate arrays. Specifically, FIG. 3A illustrates the loading of an encrypted bitstream into a configuration device and a key into a field programmable gate array, while FIG. 3B illustrates the loading of the encrypted bitstream from the configuration device to the FPGA.

FIG. 3A includes a software package 320 that further includes encryption software 322 and key storage and handling software 324, a configuration device for storing an encrypted bitstream 332, and a field programmable gate array including storage locations for key storage 342 and decryption hardware 344. A bitstream is loaded into the encryption software routine 322 via software interface 305. The encryption software encrypts the bitstream and provides an encrypted bitstream through interface 307 to the configuration device 330, where it is stored as an encrypted bitstream 332. Similarly, a key is provided by a user over interface 310 to key handling software 324 which provides the key over interface 321 to the FPGA 340. The key is stored in locations 342 for use by the decryption hardware 344.

FIG. 3B includes a configuration device that further includes encrypted bitstream 332, and a field program gate array 340 including key storage 342 decryption hardware 344 and a decrypted bitstream 346. At power up, during a fault condition, or other appropriate time, the encrypted bitstream 332 is provided by the configuration device 330 over interface 350 to the decryption hardware 344 in the field programmable gate array 340. The decryption hardware 344 also receives the key 342 stored on the field programmable gate array 340 and provides a decrypted bitstream 346. The decrypted bitstream 346 is then used to configure the FPGA such that it provides the desired logic function.

In typical applications, the activities illustrated in FIG. 3A occur either at a location (for example, their factory) under control of the field programmable gate array manufacturer (vendor) or purchaser, while the activities illustrated in FIG. 3B occur once the field programmable gate array is incorporated in an end product. Accordingly, since only the encrypted bitstream is available for detection over interface 350 in FIG. 3B, the original un-encrypted bitstream is protected from discovery.

Figure 4:
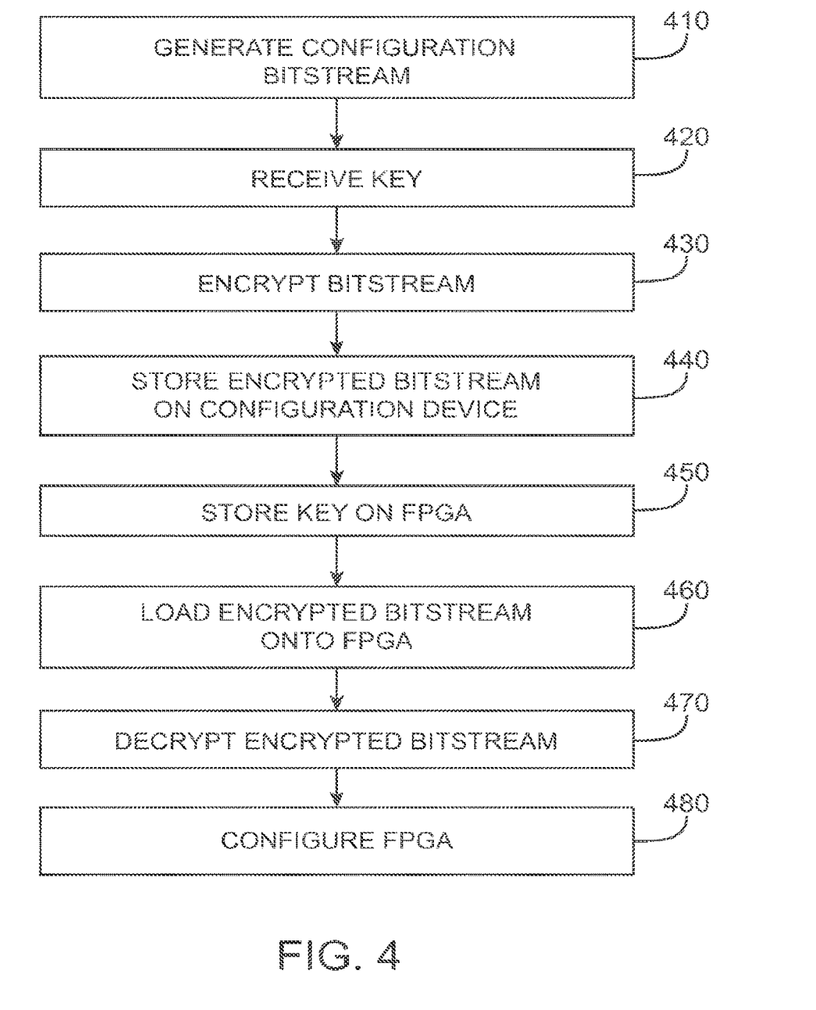
FIG. 4 illustrates a method of configuring a field programmable gate array that may be improved by incorporating embodiments of the present invention.

FIG. 4 illustrates a method of configuring a field programmable gate array that may be improved by incorporating embodiments of the present invention. In act 410, a configuration bitstream is generated. The configuration bitstream may be generated using design software such as VHDL (Very High Speed Integrated Circuit Hardware Description Language) or Verilog. In act 420, an encryption key is received, for example from a user, database, look-up table or other source. Alternately, the software program may generate its own key, or suggest a key to the user. In act 430, the key is used to encrypt the configuration bitstream, and in act 440, the encrypted bitstream is stored on a configuration device. This configuration device may be a flash memory or other non-volatile memory device, such as a memory with a self-contained battery backup. The configuration device may be an integrated circuit, compact flash card, or other device. In act 450, the key is stored on a field programmable gate array or other programmable or configurable device. The acts to this point are typically performed at a location under the control of the field programmable gate array vendor or purchaser such as an original equipment manufacturer (OEM).

The following acts typically occur at power up, after a fault or error condition, or at other appropriate times while the FPGA is in use in an electrical system. In act 460, the encrypted bitstream is loaded from the configuration device to the field programmable gate array. In act 470, the encrypted bitstream is decrypted in the FPGA and used to configure the FPGA in act 480. This configuration act configures the FPGA such that it performs the desired function.

Figure 5:
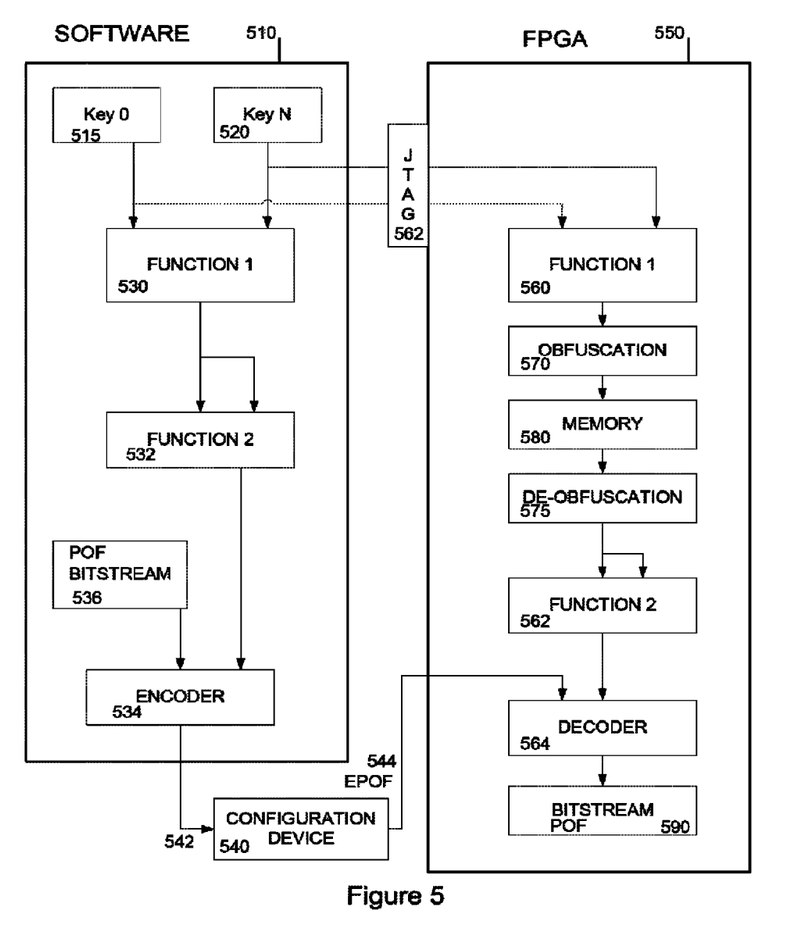
FIG. 5 illustrates circuits, software, and methods used to protect a configuration bitstream according to an embodiment of the present invention.

FIG. 5 illustrates circuits, software, and methods used to protect a configuration bitstream according to an embodiment of the present invention. This figure includes a software program or module 510, configuration device 540, and field programmable gate array 550. This figure, as with the other included figures, is shown for illustrative purposes and does not limit either the possible embodiments of the present invention or the claims.

Software module 510 receives one or more keys, Key 0 515 through Key N 520, from a user, other software program or module, or other appropriate source. For example, one or more of these keys may be provided by the software program 510 itself. Quartus, available from Altera Corporation in San Jose, Calif. is an example of a program that may be used as program 510. Alternately, these keys may be provided by a user, they may be provided or suggested by other software, found in a look-up table or other source, or provided in some other manner. The number of keys actually used may be two, or more than two keys may be used.

These keys are received by software module Function 1 530, which performs a first function on the keys to generate an output. This function, as with the other functions in this and the other figures, may include encryption, scrambling, exclusive-ORing, or combination of any of these, their reverse, or other functions. For example, one key may be encoded by the other key using a data encryption standard (DES), triple data encryption standard (3DES), or an advance encryption standard (AES), or software module. Alternately, other types of encryption or ciphering can be used.

The output of the software module, Function 1 530, is received by a second software module, Function 2 532. This module modifies the output of the first software module, Function 1 530, and provides an encoding key at its output. The second software module may perform the same function as the first software module Function 1 530, or it may perform a different function.

The output of the software module Function 2 540 and the configuration bitstream or program object file 536 are received by an encoding software module, the encoder 534. Alternately, the second software function module, Function 2 532, may be omitted, and the output of the first software function module, Function 1 530, may be received by the encoder 534. This encoder software module 534 may perform the same function as the first software module Function 1 530, or it may perform a different function. The output of the encoding software module 534 provides a masked or encoded configuration bitstream. This encoded bitstream (or encoded program object file, E-POF) is then provided on bus 542 to the configuration device 540. Typically, the configuration device 540 is sold with one or more field programmable gate arrays 550 and they are all then incorporated into an end product. In various embodiments, the configuration device is incorporated as part of the FPGA 550.

The keys, Key 0 515 through Key N 520; are also provided to FPGA 550, for example through a JTAG (Joint Test Action Group, IEEE standard 1149.1) or other appropriate interface 562. The FPGA may be an FPGA manufactured by Altera Corporation. The FPGA 550 incorporates a first function block, Function 1 560, which receives the keys, Key 0 515 through Key N 520. The first function block, Function 1 560, performs a function on them to generate an encoded key. This function may be the same as the function performed by the first software module Function 1 530. Again, as with all the software modules and function blocks described herein, this function may include encryption, such as DES, 3DES, and AES, exclusive ORing, scrambling, or other function or combination of these or other functions. The encoded key provided by function block Function 1 560 is then received by an obfuscation circuit 570. The obfuscation circuit 570 acts to disguise the encoded key. The disguised encoded key is stored in a memory array 580. In this way, even if the contents of the memory array 580 are discovered, the encoded key is protected.

Again, the encoded key is disguised from detection. Specifically, the encoded key itself is not stored, rather a version that has been obfuscated in some way is stored. For example, the key may be permutated and inverted, encrypted, or disguised in some other fashion. Further, in a specific embodiment, the key is safe from erasure or modification since the key is stored in a one-time programmable memory. For example, the key may be stored in an array of one-time programmable fuses. In other embodiments, the key may be stored in a programmable memory array, where after the key is stored, the write-enable line or path to the memory is cut or otherwise disabled.

In typical applications, the configuration bitstream is encoded and stored in a configuration device and the encoded key is stored in the memory array 580 in the device manufacturer or customer's factory. Once the device is in an end product and is being configured, the following activities occur.

The output of the memory array 580 is received by reverse or de-obfuscation circuit 575 which reconstructs the original encoded key. A second function block, Function 2 562, receives the encoded key and performs a function on it to regenerate on the FPGA 550 the encoding key used in software 510. This second function block, Function 2 562, may be the same function performed by the second software module 534. Again, this function may include encryption, exclusive-ORing, scrambling, or other function or combination of these or other functions.

The output of the second function block, Function 2 562 is provided to the decoder 564, which also receives the encoded configuration bitstream on bus 544 from the configuration device 540. Alternatively, if the second function software block 532 is omitted, the second function block Function 2 562 is similarly omitted. In this case, the output of the de-obfuscation circuit 575 is provided to the decoder 564. The decoder decodes the encoded configuration bitstream and provides a decoded bitstream 590. The FPGA is then configured using the decoded configuration bitstream 590.

In this way, the key stored in the memory array 580 is different from the key used to decode the encoded configuration bitstream. Accordingly, even the contents of the memory array 580 are discovered, for example by reverse engineering, the key used to encode and decode the configuration bitstream, and thus the configuration bitstream itself, remains protected.

It should be noted that multiple, separate function circuits are shown. In this example, a first function block, Function 1 560, a second function block, Function 2 562, and a Decoder 564, are shown. In typical embodiments, these are one function block circuit that is reused multiple times. For example, multiplexers at the circuit input and output may be used to direct data to and from the function block at different points in the circuit's operation. In a typical embodiment, this circuit is a dedicated, hardwired circuit, since the encoded configuration bitstream is not available to configure it. In other embodiments, the circuitry may be configurable and configured by bits that are either included in a portion of the bitstream that is not encoded, hardwired into the integrated circuit, or provided in some other appropriate manner. Similar concepts apply to the software program modules included in these figures.

Again, the function blocks is this and the other included examples may provide or include an encryption function. This encryption function may be stand-alone or part of a larger function. The encryption may be AES, though other encryption circuits may be used, for example 3DES, or simply DES circuits, or other proprietary encryption algorithms may be used. Also, unconventional numbers of rounds of encryption may be used. For example, instead of a conventional 10 rounds of AES encoding, 5, 15, or other numbers of rounds may be used. In the future there will be other encryption schemes that will certainly be developed and may alternately be used. In a specific embodiment of the present invention, one or more keys having a length of 128 bits are used, though other lengths, such as 192 and 265 bits, may be used. Also, each device may have an individual key, each design may have a common key, each customer may have a key, or other arrangements may be made.

Also, in some embodiments of the present invention, erasure and modification of the key is prevented by storing the key in a number of one-time programmable fuses. These fuses are typically polysilicon fuses that are either blown, or left as a connection. Alternately, as mentioned above, the fuses may be replaced by other nonvolatile memory structures, for example where the means for writing or erasing data stored in the memory structures is permanently disabled once the key is written. For example, a flash memory may be used, where the write enable line is disabled by blowing a fuse once the key is written. This type arrangement removes the necessity of a battery that is found in many prior art solutions. These batteries have been a consistent source of reliability problems and can cause electrostatic discharge thus damaging the device.

Using this type of memory prevents erasure and modification of the contents of the memory 580, thus helping to ensure that the device cannot be reconfigured to perform a different function than what was intended. Further security may be had by using a message authentication function.

In this and the other included figures, the bitstream is encoded then decoded. In some applications, less than the entire bitstream is encoded. For example, there may be header information or the like which is common to all devices and may be generally known. If this information is encrypted, the key could be determined. Accordingly, this information is typically not encoded in embodiments of the present invention.

Figure 6:
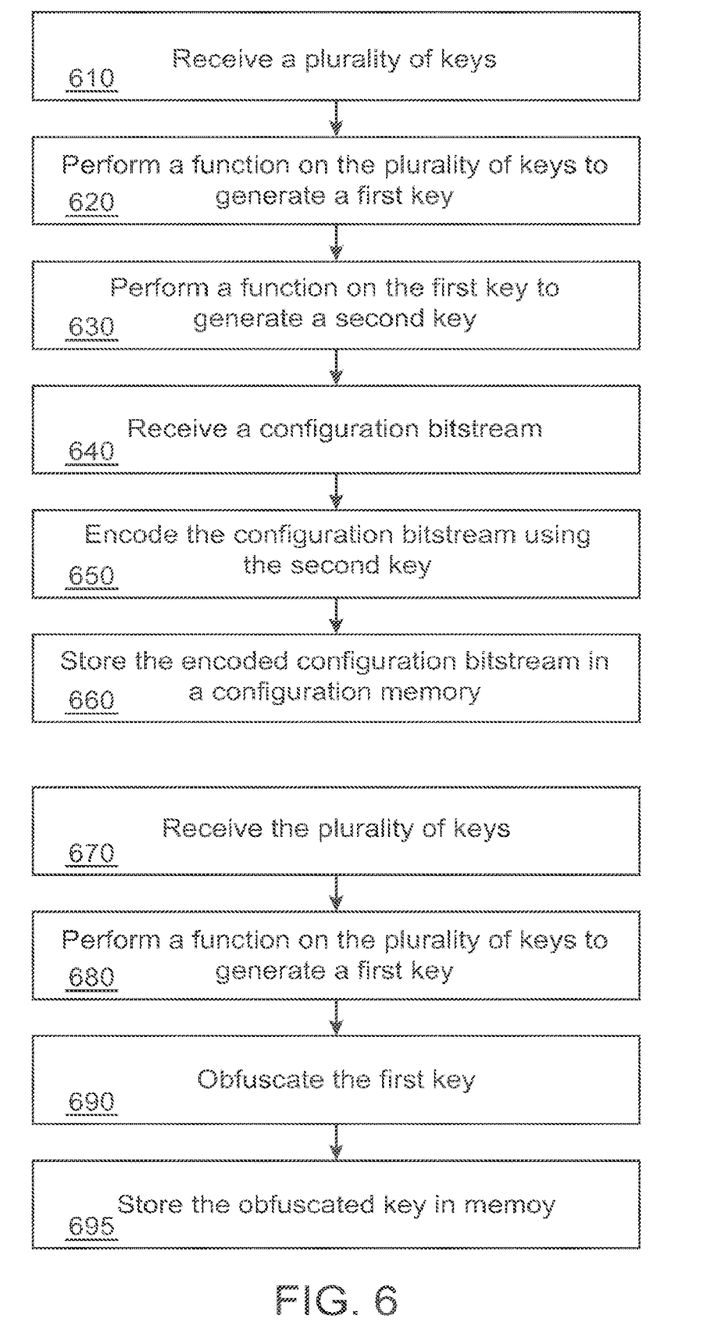
FIG. 6 is a flowchart illustrating a method of encoding a configuration bitstream and storing a key consistent with an embodiment of the present invention.

FIG. 6 is a flowchart illustrating a method of encoding a configuration bitstream and storing a key consistent with an embodiment of the present invention. These acts typically occur under the control of a field programmable gate array vendor or purchaser before equipment incorporating the field programmable gate array is placed in service.

In act 610, a plurality of keys is received, typically by a software program or module. It will be appreciated by one skilled in the art that these keys may have alternate sources. For example, these keys may be provided by users, software, third parties, or they may originate from other appropriate sources. In act 620, a function is performed on the plurality of keys to generate a first key.

In act 630, a function is performed on the first key to generate a second key. For example, the first key may be encrypted using itself to generate the second key. In act 640, a configuration bitstream is received. This configuration bitstream may be generated by an FPGA place & route tool like Altera's Quartus, or other similar source. In act 650, at least a part of the bitstream is encoded with the second key in order to generate an encoded bitstream. The encoded bitstream is stored in a memory on a configuration device or on an FPGA in act 660.

In act 670, the plurality of keys are received by an FPGA or other configurable integrated circuit. In act 680, a function is performed on the keys to generate the first key. In act 690, the first key is obfuscated or otherwise disguised. The obfuscated first key is stored in memory on a field programmable gate array or other such appropriate device in act 695.

Figure 7:
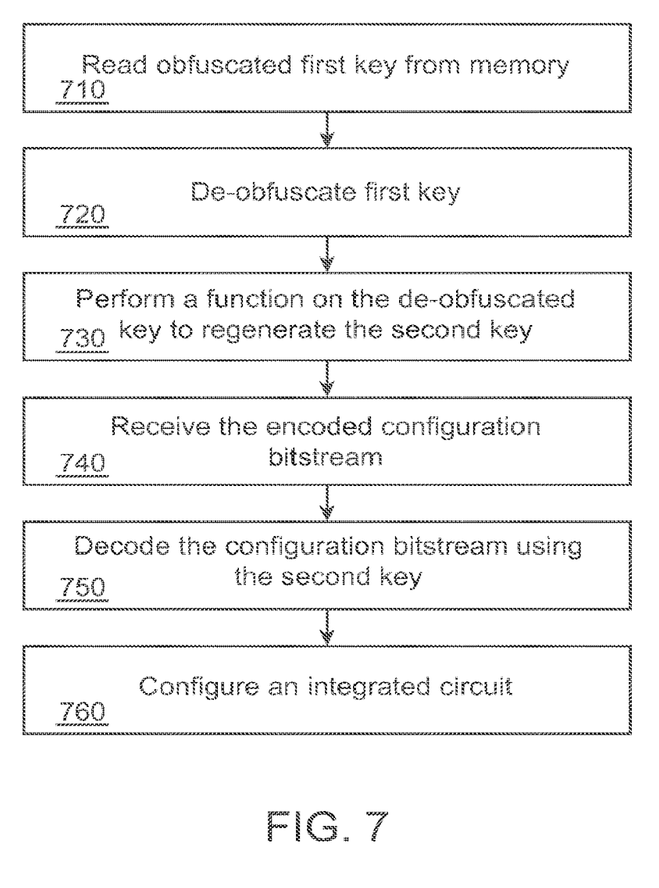
FIG. 7 is a flowchart illustrating a method of retrieving a key and decoding a configuration bitstream according to an embodiment of the present invention.

Modifications and variations may be made to this and the other included flowcharts consistent with embodiments of the present invention. For example, the first key may be used to encode the configuration bitstream, that is the function performed to generate the second key is omitted. If act 630 is omitted, then act 730 in the following figure should also be omitted, as is described below.

FIG. 7 is a flowchart illustrating a method of retrieving an encoded key and decoding a configuration bitstream according to an embodiment of the present invention. In act 710, the obfuscated first key is retrieved from memory and de-obfuscated in act 720. In act 730, a function is performed on the first key to regenerate the second key. In act 730, a function is performed on the first key to regenerate the second key that had been generated in software, but this time on the FPGA. The encoded bitstream is received in act 740, and it is decrypted using the second key to generate a configuration bitstream in act 750. In act 760, an FPGA or other configurable integrated circuit is configured using the decrypted bitstream.

It will be appreciated by one skilled in the art that these acts may be modified or rearranged, and that some acts may be optional while others may be added consistent with the present invention. For example, if act 630 is not used during the encryption of the bitstream, then act 730 is not needed and should be omitted. In this case, the first key is used to decode the encoded configuration bitstream in act 750.

Figure 8:
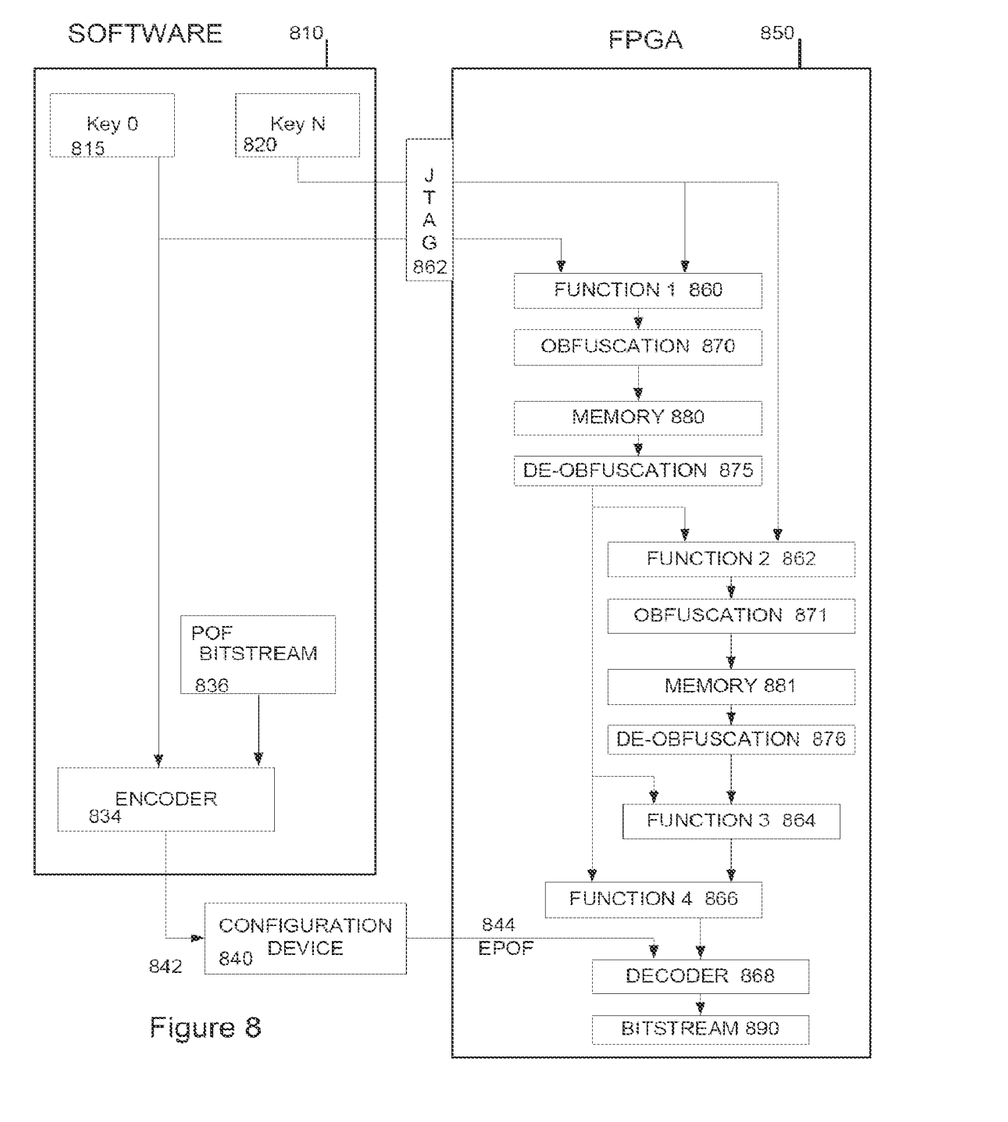
FIG. 8 illustrates circuits, software, and methods used to protect a configuration bitstream according to another embodiment of the present invention.

FIG. 8 illustrates circuits, software, and methods used to encode and decode a configuration bitstream according to another embodiment of the present invention. This figure includes a software program 810, configuration device 840, and a field programmable gate array 850.

The software module 810 receives or generates a plurality of keys, Key 0 815 through Key N 820. Key 0 815 is used to encrypt the configuration bitstream 836 by encoder software module 834. Encoder software module 834 provides an encoded bitstream to the configuration device 840.

The keys, Key 0 815 through Key N 820, are also received by the FPGA 850 via JTAG interface 862. Function 1 860 performs a function on these keys to generate a first key. The first key is obfuscated, for example by permutation and inversion circuits, encryption, or other function, by circuit 870 and stored in memory 880. The first key, and one or more other keys, are received by Function 2 862, which performs a function on them to generate a second key. This second key is obfuscated by circuit 871, and the obfuscated second key is stored in memory 881.

When the device is to be configured, the first key and is received by reverse or de-obfuscation circuit 875, which reconstructs the first key, and provides it to Function 3 864 and Function 4 866. The second key is received by de-obfuscation circuit 876, which provides it to Function 3 84. Function 3 864 modifies the first and second keys and provides an output to Function 4 866. Function 4 reconstructs Key 0 815 and provides it to decoder 868. Decoder 868 receives the encoded bitstream on bus 844 and decodes it using Key 0 815. The decoded bitstream 890 is then used to configure FPGA 850.

In this figure, the function blocks Function 1 860 and Function 2 862 may be encryption, scrambling, exclusive-OR, or other types of circuits. The function blocks Function 3 864 and Function 4 866 are typically the inverse of the above function, and may include decryption, descrambling, exclusive-OR, or other types of circuits.

Figure 9:
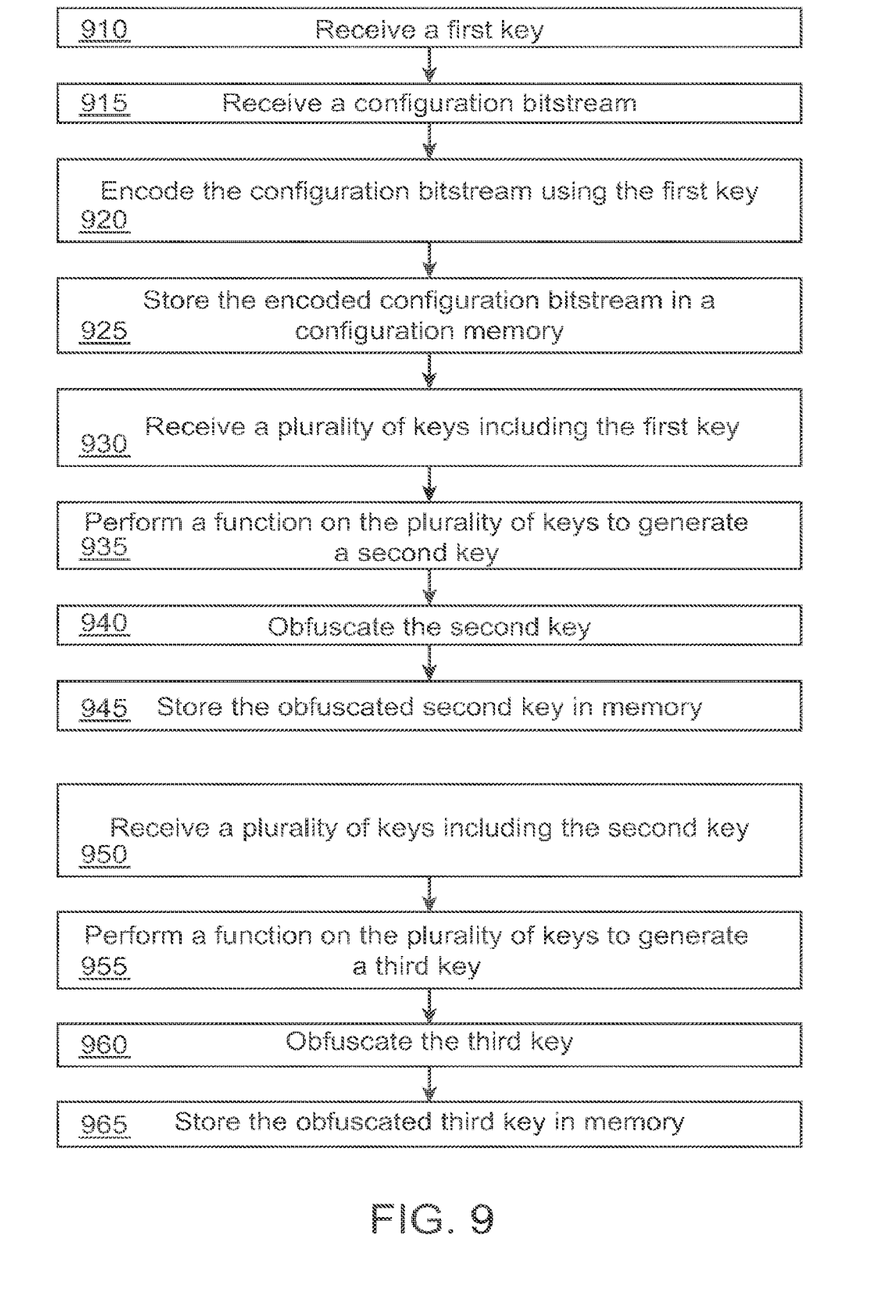
FIG. 9 is a flowchart illustrating a method of encoding a bitstream and storing a plurality of keys according to an embodiment of the present invention.

FIG. 9 is a flowchart illustrating a method of encoding a bitstream and storing a plurality of encoding keys in memory according to an embodiment of the present invention. In act 910, a first key is received. These keys, as with all the keys in these examples, may be received from a user, from software, from storage, such as a lookup table, or other source. In act 915, a configuration bitstream is received. In act 920, a configuration bitstream is encoded using the first key in order to generate an encoded bitstream. In act 925, this encoded bitstream is stored on a configuration device.

In act 930, a plurality of keys, including the first key, is received on an FPGA or other configurable device. In act 935, the function is performed on the keys to generate a second key. The second key is obfuscated in act 940 and stored in memory in act 945. In act 950, a plurality of keys including the second key is received, and in act 955 a function is performed on them to generate a third key. The third key is obfuscated in act 960, and in act 965 it is stored in memory.

Figure 10:
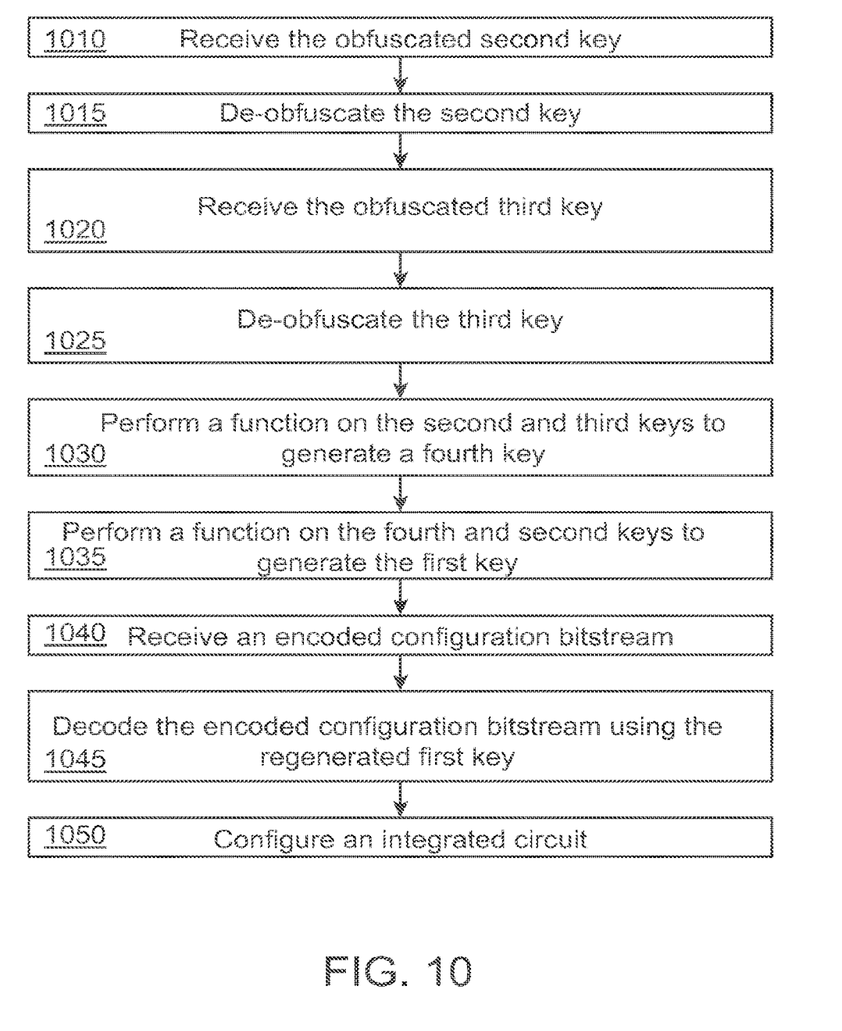
FIG. 10 is a flowchart of a method of retrieving a plurality of keys and decoding a configuration bitstream according to an embodiment of the present invention.

FIG. 10 is a flowchart of a method of retrieving a plurality of encoding keys and decoding a configuration bitstream according to an embodiment of the present invention. In act 1010, the obfuscated second key is received, and de-obfuscated in act 1015. In act 1020, the obfuscated third key is received and de-obfuscated in act 1025.

A function is performed on the second and third keys to generate a fourth key in act 1030. A function is performed on the fourth key and the second key in order to regenerate the first key in act 1035. In act 1040, the encoded configuration bitstream is received. In act 1045, the encoded bitstream is decoded using the regenerated first key. An FPGA or other configurable device is configured in act 1050.

In this figure, the functions performed in acts 1030 and 1035 are likely the inverse of the functions performed in 935 and 955 in FIG. 9. For example, if scrambling or encryption are done in acts 935 and 955, descrambling or decryption are done in acts 1030 and 1035.

Figure 11:
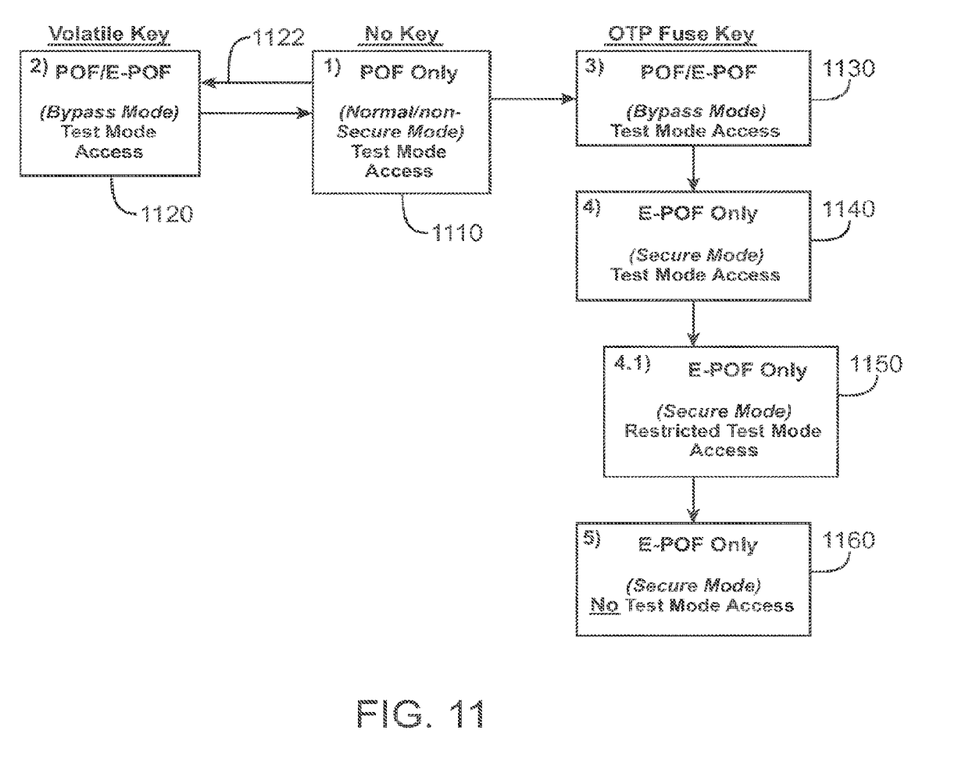
FIG. 11 is a chart illustrating a number of different device and test mode access states for a device consistent with an embodiment of the present invention.

FIG. 11 is a chart illustrating a number of different test mode access states for a device consistent with an embodiment of the present invention. In state 1110, non-encrypted bitstreams are used. In this mode, no encryption keys are programmed into the device. And also in this mode, a test mode access is provided. This test mode access is typically only known to vendors and not their customers. This mode is useful in evaluating failures that occur in the field during operation of the device. Using the test mode access, vendors may configure the device into a known test configuration thereby and enabling failure analysis of the device.

State 1120 is an optional state that may be included on some devices that are consistent with embodiment of the present invention. In this mode, the key or keys are not stored in one-time programmable fuses or other nonvolatile memories, but are instead stored in a volatile memory such as a register. In this mode, if a non-encrypted configuration bitstream is received, the key can be ignored and decrypting circuitry can be bypassed. Typically, test mode access is enabled in this mode, though in alternate embodiments of the present invention test mode access may be disabled. This state may be particularly useful in an application where a panic mode is desirable. For example, during capture of a device, it may be desirable to erase the key making the device inoperable. A panic mode may also be implemented using a one-time programmable fuse array, where all fuses are blown when a panic situation arises and device enters the panic mode.

State 1130 is used when a one-time programmable key is entered into the device. In this mode, the configuration bitstream may either be encrypted or un-encrypted. When a non-encrypted bitstream is entered, the decryption circuitry is bypassed. Typically, a test mode access is enabled in this state. State 1140 is used when it is desirable that only encrypted bitstreams be allowed. Also, test mode access is typically allowed in this mode.

State 1150 requires an encrypted bitstream and allows test mode access once the user enters the correct key into device. If the entered key and the stored key are a match, test access is enabled. In state 1160, no test mode access is allowed under any circumstances. Once a device is in this mode no diagnosis may be made on failed parts.

The state of a particular device may be controlled by a separate state machine, as indicated by the arrows between states, such as arrow 1122. For example, if a device is in the normal, non-secure mode 1110, it may be placed in the volatile key mode 1120, and vice versa. For example, if the power is removed when the device is in the volatile key state 1120, it may return to no key state 1110. Once a higher level of security is required, for example state 1130, it cannot return to a lower security state. This prevents modification of the device once it is in an application.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of processing a configuration bitstream at a user computing device comprising:
   obtaining, at the user computing device, a plurality of encryption keys and the configuration bitstream;
   encoding the configuration bitstream using the plurality of encryption keys to generate an encrypted bit stream;

providing the encrypted bit stream to a configuration device; and providing, via a JTAG interface of the user computing device, the plurality of encryption keys to an integrated circuit.

2. The method of claim 1, wherein the plurality of encryption keys is provided by a user via a software interface.

3. The method of claim 1, wherein the plurality of encryption keys is generated by the user computing device in response to execution of a software module on the user computing device.

4. The method of claim 1, wherein the encoding is performed using an encryption function selected from a group consisting of a triple data encryption standard (3DES) and an advanced encryption standard (AES).

5. The method of claim 1, wherein the configuration bitstream is in the form of VHDL code or Verilog code.

6. The method of claim 1, wherein the providing of the plurality of encryption keys to the integrated circuit is performed in response to detection of a power up phase of the integrated circuit.

7. The method of claim 1, wherein the providing of the plurality of encryption keys to the integrated circuit is performed in response to detection of an error condition during operation of the integrated circuit.

8. A method of processing a configuration bitstream at a user computing device comprising:

obtaining, at the user computing device, a plurality of encryption keys and the configuration bitstream;

processing the configuration bit stream based, at least in part, on the plurality of encryption keys to generate an encrypted bit stream;

providing the encrypted bit stream to a configuration device external to the user computing device; and providing, via a JTAG interface of the user computing device, the plurality of encryption keys to an integrated circuit.

9. The method of claim 8, wherein processing the configuration bit stream comprises:

applying a function to the plurality of encryption keys to produce an encoded key; and providing the encoded key and the configuration bitstream to an encoder to produce the encrypted bit stream.

10. The method of claim 8, wherein the configuration bitstream is in the form of VHDL code or Verilog code.

11. The method of claim 9, wherein the function is equivalent to a corresponding function used in an integrated circuit communicatively coupled to the configuration device.

12. The method of claim 9, wherein the encrypted bit stream is encoded based on a triple encryption standard (3DES).

13. The method of claim 11, wherein the encrypted bit stream is provided to the configuration device in response to detection of a power up phase of the integrated circuit.

14. A user computing device comprising:

a software module configured to:
receive a plurality of encryption keys; and
process the plurality of encryption keys according to a function
to produce an encoded key;

an encoder configured to:
receive a configuration bitstream; and
process the configuration bitstream using the encoded key to produce an encrypted bit stream;

a first interface configured to provide the encrypted bit stream to a configuration device external to the user computing device; and a second interface configured to provide at least one encryption key of the plurality of encryption keys to an integrated circuit external to the user computing device.

15. The user computing device of claim 14, wherein the configuration bitstream is in the form of VHDL code or Verilog code.

16. The user computing device of claim 14, wherein the function is equivalent to a corresponding function used in an integrated circuit communicatively coupled to the configuration device.

17. The user computing device of claim 14, wherein the user computing device is further configured to provide the at least one encryption key of the plurality of encryption keys to the integrated circuit in response to detection of an error condition during operation of the integrated circuit.

18. The user computing device of claim 14, wherein the user computing device is further configured to provide the at least one encryption key of the plurality of encryption keys to the integrated circuit in response to detection of a fault during operation of the integrated circuit.

* * * * *